W. MARSH.
Hand-Cultivators.

No. 148,226. Patented March 3, 1874.

WITNESSES.

INVENTOR,
W. Marsh

By his Attorneys.

UNITED STATES PATENT OFFICE.

WILLIAM MARSH, OF SUN PRAIRIE, WISCONSIN.

IMPROVEMENT IN HAND-CULTIVATORS.

Specification forming part of Letters Patent No. 148,226, dated March 3, 1874; application filed October 13, 1873.

*To all whom it may concern:*

Be it known that I, WILLIAM MARSH, of Sun Prairie, in the county of Dane and State of Wisconsin, have invented a new and Improved Hand-Cultivator; and I do hereby declare the following to be a full and exact description of the same, reference being had to the accompanying drawings forming part of this specification, in which—

Figure 1:
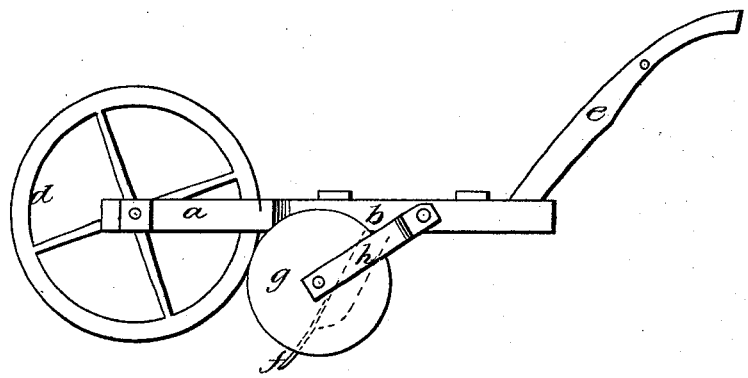
Figure 2:
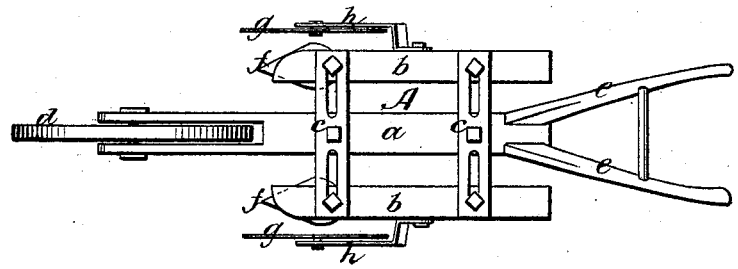

Figure 1 is a side elevation of my invention, and Fig. 2 is a plan view.

Similar letters of reference in the accompanying drawings denote the same parts.

My invention relates especially to garden-cultivators propelled by hand, and has for its object to provide means for running the cultivator close to the growing plants without covering the latter with dirt from the teeth, and to improve the construction of the cultivator. To these ends it consists in the peculiar construction of the cultivator-frame, and in providing the sides of the same, in close proximity to the outer teeth, with adjustable revolving guards, so located as to be continually interposed between the teeth of the cultivator and the plants between which it operates, as I will now proceed to describe.

In the drawings, A represents the frame of the cultivator, composed of the central beam $a$ and the shorter parallel side beams $b\ b$, the whole being adjustably connected by transverse slotted plates $c\ c$. In the forward end of the central beam $a$ is journaled the guide-wheel $d$, and at the rear end are attached the handles $e\ e$. $f\ f$ represent the cultivator-teeth attached to the side beams $b$. $g\ g$ represent thin metallic disks journaled in the free ends of arms $h$, the latter having their opposite ends pivoted to the outer sides of the beams $b$, so as to be adjustable by swinging longitudinally in either direction. The arms $h$ are bent near their pivoted ends, so as to enable the disks or guards $g$ to revolve close to the teeth $f$ without being in contact with them.

In operating the cultivator, the side beams are adjusted at the desired distance from the central beam by means of the slotted plates $c\ c$, and bolts passing through the same. The teeth $f$ and guards $g$, being attached to the adjustable beams, do not require separate adjustment with relation to said beams, and are always ready for operation by loosening the screws or bolts that pivot the arms $h$ to the side beams, and swinging the same until the disks are in the required position, when they are held by tightening the screws.

The revolving guards offer little or no impediment to the operation, and effectually prevent the soil from being thrown outward from the teeth upon the plants; consequently the cultivator is enabled to run close to the rows.

The arms $h$ may be slotted at their upper ends where they are pivoted to the beams $b$, to facilitate their adjustment.

Having thus described my invention, what I claim as new is—

1. The adjustable arms $h$, pivoted to the frame of a cultivator, in combination with the rotating guards $g$, substantially as described, for the purpose specified.

2. The parallel side beams $b\ b$, having the teeth $f$ and rotating guards $g$, in combination with the slotted plate $c\ c$ and central beam $a$, substantially as and for the purpose specified.

3. In combination with the elongated central beam $a$, guide-wheel $d$, slotted transverse plates $c$, and parallel side beams $b$, the teeth $f$, pivoted arms $h$, and rotating guards $g$, substantially as described, for the purpose specified.

WILLIAM MARSH.

Witnesses:
C. L. LONG,
H. F. MARSH.